Figure 1:
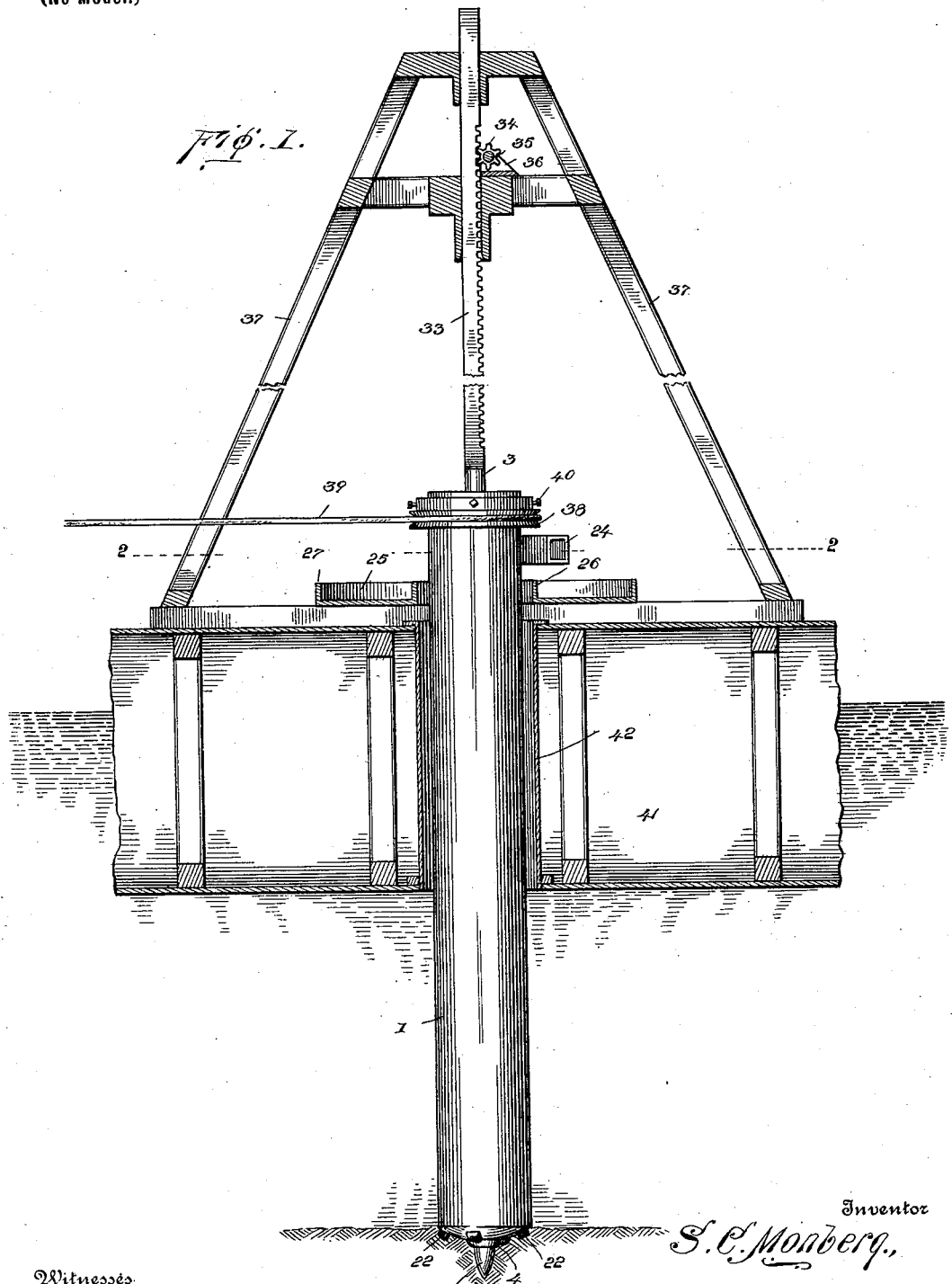

No. 686,467. Patented Nov. 12, 1901.
S. C. MONBERG.
SUBAQUEOUS MINING MACHINE.
(Application filed Jan. 12, 1901.)

(No Model.) 5 Sheets—Sheet 1.

Witnesses
F. W. Riley,
Geo. Ackman.

Inventor
S. C. Monberg,
By Victor J. Evans
Attorney

No. 686,467.  
Patented Nov. 12, 1901.  
S. C. MONBERG.  
SUBAQUEOUS MINING MACHINE.  
(Application filed Jan. 12, 1901.)
(No Model.)  
5 Sheets—Sheet 2.
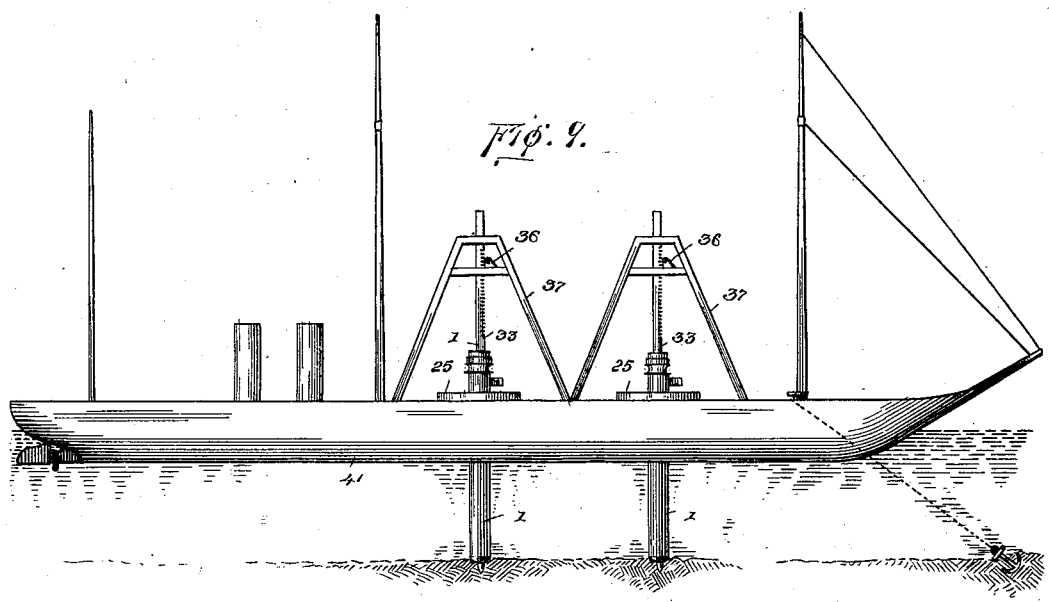
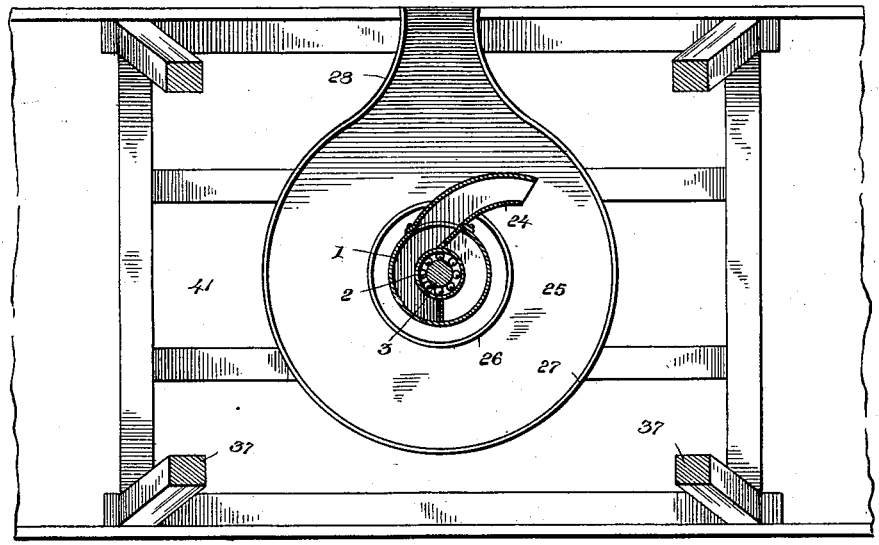
Witnesses  
Inventor  
S. C. Monberg,  
By Victor J. Evans  
Attorney

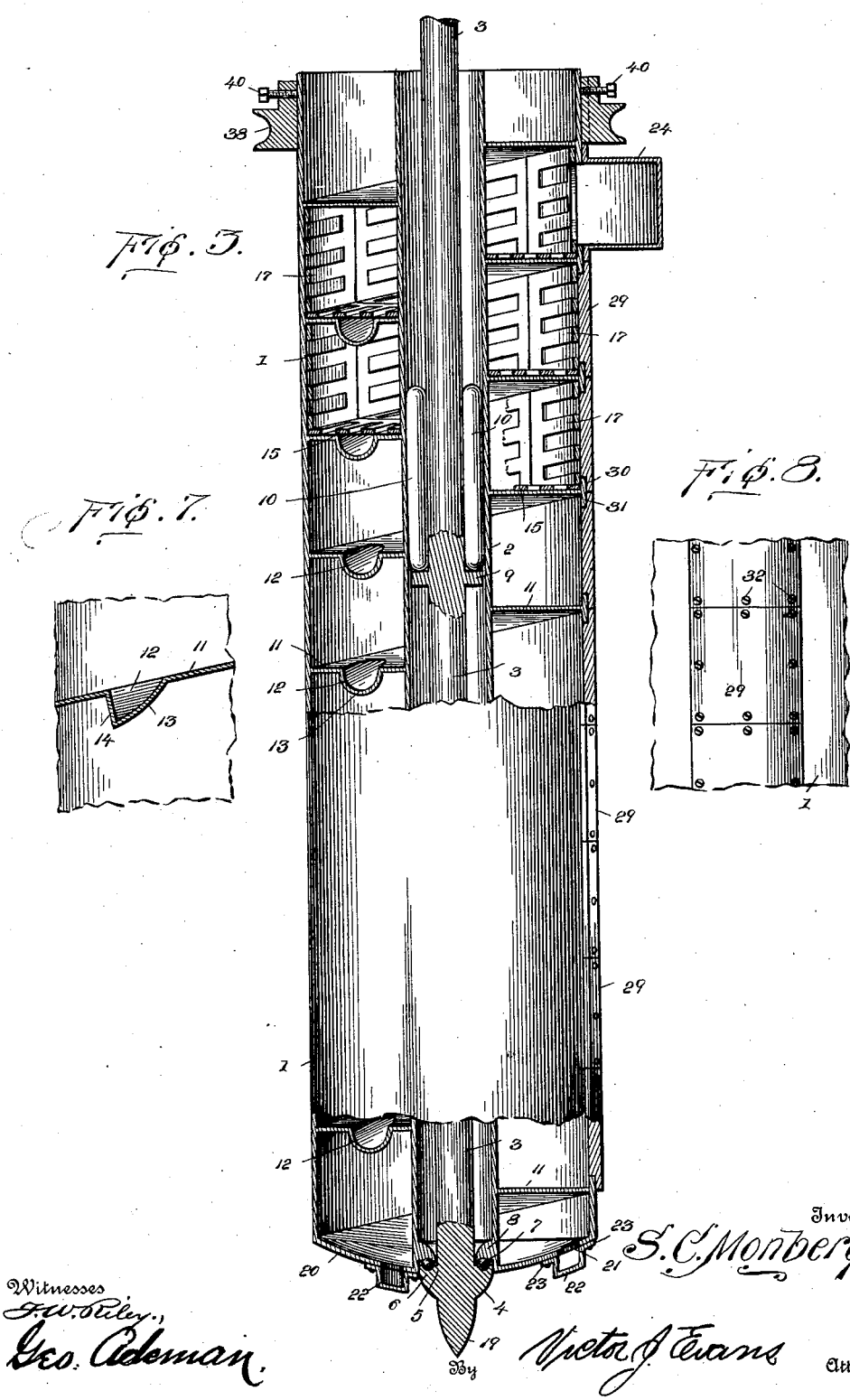

No. 686,467. Patented Nov. 12, 1901.
S. C. MONBERG.
SUBAQUEOUS MINING MACHINE.
(Application filed Jan. 12, 1901.)

(No Model.) 5 Sheets—Sheet 4.

Witnesses
Geo. Ackman.

Inventor
S. C. Monberg,
By Victor J. Evans
Attorney

No. 686,467. Patented Nov. 12, 1901.
S. C. MONBERG.
SUBAQUEOUS MINING MACHINE.
(Application filed Jan. 12, 1901.)
(No Model.) 5 Sheets—Sheet 5.
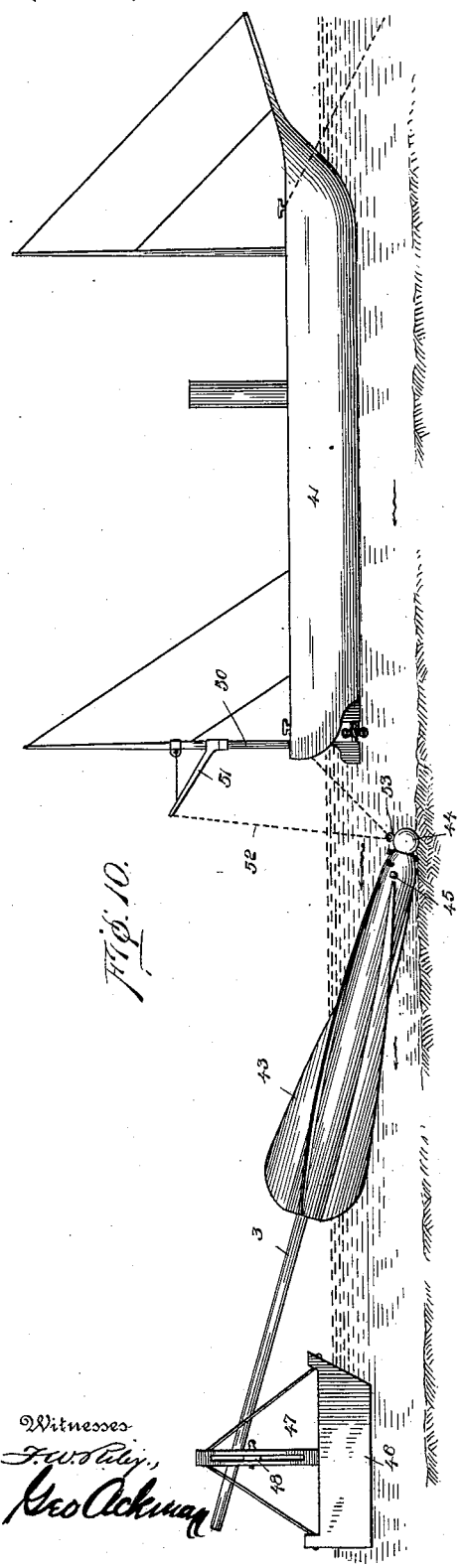
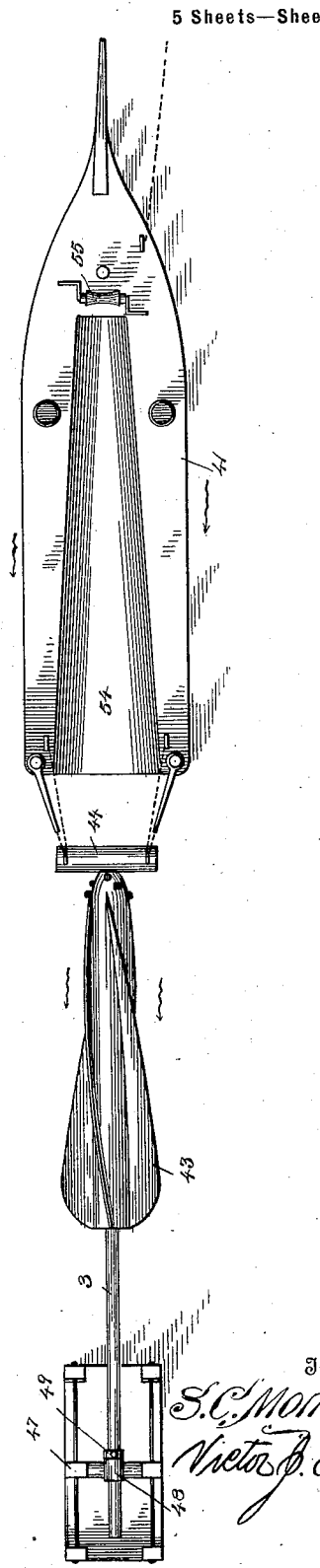
Fig. 10.
Fig. 11.
Witnesses
Inventor
S. C. Monberg,
Victor J. Evans
Attorney

UNITED STATES PATENT OFFICE.

SOREN C. MONBERG, OF LEADVILLE, COLORADO.

SUBAQUEOUS MINING-MACHINE.

SPECIFICATION forming part of Letters Patent No. 686,467, dated November 12, 1901.

Application filed January 12, 1901. Serial No. 43,029. (No model.)

*To all whom it may concern:*

Be it known that I, SOREN C. MONBERG, a citizen of the United States, residing at Leadville, in the county of Lake and State of Colorado, have invented new and useful Improvements in Subaqueous Mining-Machines, of which the following is a specification.

This invention relates to improvements in subaqueous mining-machines; and the object in view is to provide an apparatus or mechanism for recovering gold and other valuable minerals from the beds of lakes, rivers, bays, and shoal waters lying adjacent to the shores of greater bodies of water.

The invention contemplates the use of a revolving casing, preferably of cylindrical form, adapted to be mounted upon a float which may be in the form of a vessel of ordinary construction in the main and to be revolved by suitable mechanism carried by the float or by the current acting on the casing when submerged. The casing is provided with a conical end portion adapted to operate in contact with the bed of the stream and provided with means whereby the sand, dirt, or mud is taken up and carried to the inside of the casing and conveyed lengthwise thereof to the point of discharge, the interior of the casing being equipped with suitable riffles and quicksilver-pockets for taking up the valuable minerals. In connection with the revoluble casing means are provided for adjusting the angle of the sluice-box as a whole and also for varying the depth to which the casing projects, according to the depth of the water at the point where the operations are being carried on.

The detail objects and advantages of the invention will be fully pointed out in the course of the ensuing description.

The invention consists in an improved subaqueous mining-machine embodying certain novel features and details of construction and arrangement of parts, as hereinafter fully described, illustrated in the accompanying drawings, and incorporated in the claims.

Figure 4:
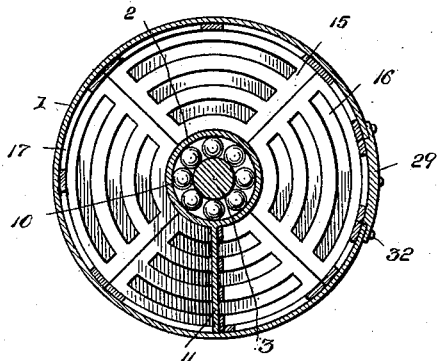
Figure 5:
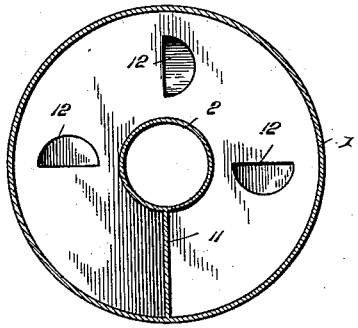
Figure 6:
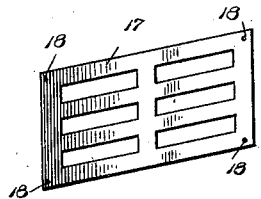
Figure 12:
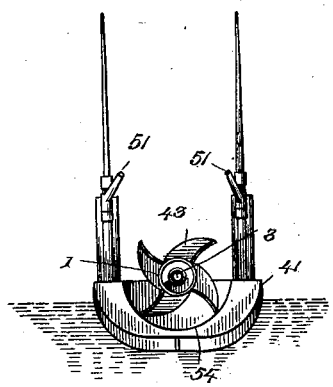

In the accompanying drawings, Figure 1 represents a side elevation of a vertically-disposed casing embodying my improvements, showing also a partial longitudinal section through the float by which the mechanism is carried and with means for raising and lowering the casing. Fig. 2 is a horizontal cross-section through the same, taken on the line 2 2 of Fig. 1. Fig. 3 is an enlarged central longitudinal section through the casing, showing the interior constructions and parts and also showing the manner of mounting the same on the supporting-shaft, &c. Fig. 4 is a cross-section through the same. Fig. 5 is a cross-section similar to Fig. 4, omitting the riffle-sections and showing the quicksilver-pockets. Fig. 6 is a detail view of one of the side riffle-sections. Fig. 7 is a detail vertical section showing the form of one of the quicksilver-pockets. Fig. 8 is an elevation of a portion of the outside shell or casing, showing the removable door-sections for giving access to the interior. Fig. 9 represents a side elevation of a float or vessel with a plurality of my improved machines mounted thereon. Fig. 10 is a similar view showing the machine arranged at an inclination and equipped with spiral blades for adapting the casing to be revolved by the current. Fig. 11 is a plan view of the same. Fig. 12 is a rear elevation of the float, showing the manner of carrying the machine in going to and coming from the place of operation.

Similar numerals of reference designate corresponding parts in all the figures of the drawings.

The casing and its interior constructions, as clearly illustrated in Fig. 3, comprise an outer shell or casing 1 and an inner shell or casing 2, said portions of the casing being cylindrical and the inner casing 2 being designed to receive a stationary shaft 3, around which the casing revolves. In carrying out the present invention the shaft 3 is provided at its lower end with an annular enlargement 4, forming a shoulder 5, which is provided with an annular groove 6 to receive a circular row of antifriction-balls 7, which also engage a corresponding groove in the lower surface of an interior annular flange 8, contained within the inner shell or casing 2, thus adapting the casing to revolve freely on the shaft and greatly reduce the friction incident to the revolution thereof. At one or more points in its length the shaft is provided with annular flanges 9 for the support of antifrictionrollers 10, which are interposed between the inner casing 2 and the shaft 3. These rollers 10, in connection with the balls 7, reduce the friction to a minimum and enable the casing to be revolved easily and smoothly and with a small expenditure of power.

Between the outer shell 1 and the inner shell 2 is a spiral web or floor 11, extending from the outer shell to the inner shell and forming a spiral conduit, by means of which the excavated sand, &c., is carried lengthwise of the casing to the point of discharge. The spiral web 11 is provided at numerous points with pockets 12, adapted to contain quicksilver for taking up the fine particles of mineral ore contained in the sand, dirt, &c. Each pocket is provided with one inclined wall 13 and one abrupt and approximately vertical wall 14, so as to catch and hold the deposit. The entire spiral web or floor is covered with riffle-sections 15 of segmental or quadrantal form, the same being cut away or slotted to form concentrically-arranged pockets 16 for catching and retaining the heavier particles of the material as it passes upward over the spiral floor and through the casing to the point of discharge. The sections 15 abut closely at their meeting edges and serve to retain each other in place, although, if desired, they may be permanently secured by any suitable fastening means, connecting them with the web or floor 11. In the same manner the inner surface of the outer shell 1 is lined with riffle-sections 17, similar in construction and arrangement to the riffle-sections 15 and held snugly against the outer shell 1 by means of suitable fasteners passing through openings 18 in said sections. By means of the riffle-sections arranged in the manner described the machine is adapted to be operated either in a vertical, horizontal, or an inclined position.

The lower end of the shaft 3 is pointed, as shown at 19, adapting it to enter the bed of the stream and form a bearing for the shaft of the casing. The lower end of the casing is approximately conical, as shown at 20, and provided with openings 21, covered by the shovels 22, provided with flanges 23 for securing the same to the bottom of the casing. These shovels are provided with inclined bottoms and are adapted during the revolution of the casing to scoop up the sand, &c., which is thereby carried into the casing and delivered upon the spiral web or floor and brought into engagement with the riffle-sections, which catch and hold the heavier particles of the material in its progress toward the upper or discharge end of the casing. Adjacent to the upper or discharge end of the casing is arranged a discharge-spout 24, which leads off tangentially from the casing and when the machine is set up overlies a circular tray or pan 25, in which the material is received, said pan being provided with inner and outer flanges 26 and 27, respectively, the outer flange 27 terminating in a laterally-projecting spout 28, beneath which may be placed a suitable receptacle for receiving the material.

Periodically it is necessary for one or more attendants to have access to the interior of the casing for cleaning the interior thereof and removing the more valuable material. In order to afford access to the interior of the device, a suitable longitudinal opening is made in one side of the outer shell of the casing, which is divided into a series of openings by plates 31, secured across the opening and located at the recurring edges of the spiral floor 11. The spaces between the plates 31 are closed by suitable plates or doors 29, having their vertical sides and ends rabbeted, as at 30, to lie over the vertical edges of the openings and the cross-plates 31, as indicated in Figs. 3 and 8 of the drawings. The closures or doors 29 may be held in place by means of screws or other suitable fastening devices 32, and any one or more of the sections 29 may be removed, according to the vertical adjustment of the casing, for enabling a person to have access to the interior directly from the deck of the float or vessel by which the machine is carried.

The discharge-spout 24 may be detached from the outer shell 1 and applied thereto at any point in the length of the shell by removing any one of the door-sections 29 and substituting said spout in place thereof, so as to locate the discharge-spout at a suitable elevation just above the receiving pan or tray 25.

In order to adjust the casing up and down, the shaft 3 is provided at its upper end with a rack-bar extension 33, which is engaged and actuated by a spur gear-wheel 34, fast on a shaft 35, mounted in bearings 36 on a suitable frame 37, supported on the floor or deck of the float and arranged immediately over the casing. The shaft 35 may be operated by hand or by mechanism connecting it with a motor contained on the float or vessel.

In order to revolve the casing, it is provided at a suitable point with a pulley 38, adapted to receive a driving-belt 39 from any suitable motor, the pulley being adjustable up and down on the outer shell 1 by means of binding-screws 40, as clearly shown in Figs. 1 and 3, thus enabling the driving-belt 39 to be kept at the proper elevation. A sprocket-chain and sprocket-wheel may be substituted for the driving-band and pulley if preferred.

The float or vessel (indicated at 41) is provided with cylindrical housings 42, extending from the deck thereof to the bottom of the hull and fitted with a water-tight joint at both ends, so that the outer shell of the casing may be received therein and may pass therethrough without danger of leakage to the interior of the vessel. In Fig. 9 I have shown the float equipped with two machines, arranged one in front of the other. The number of machines employed may be of course increased or diminished at will and according to the capacity of the float. In the operation of the machine the vessel is ordinarily anchored, as illustrated in Fig. 9, as otherwise there would be a constantly-varying depth of water in which to operate.

In Fig. 10 I have illustrated the method of using the machine in an inclined position. When used in this position, the casing may be revolved by the action of the current by providing the outer shell 1 with spiral blades 43, which form, in effect, a screw, the blades being set at oblique angles, so as to be acted upon by the current. The forward or lower end of the casing is under this arrangement provided with a weighted extension 44, which will lie upon the bed of the stream and hold the receiving end of the casing in contact therewith. Under this arrangement also the conical or pointed end of the casing will be provided with laterally-projecting shovels 45 similar in construction to those 22 hereinabove referred to.

In order to adjust the angle of the casing shown in Figs. 10 and 11, the shaft 3 is extended and adapted to be supported upon a supplemental float 46, arranged at a suitable distance from the main float. In order to properly support and adjust the shaft 3, the float 46 is provided with uprights or standards 47, slotted or grooved to receive and permit of the adjustment of a vertically-movable box or bearing 48, through which the shaft 3 passes, longitudinal movement of the shaft being limited or prevented by means of a collar 49, adjustable lengthwise of the shaft 3 and adapted to abut against the bearing 48. Said bearing may be adjusted up and down to any desired point and held by any suitable fastening means.

In order to raise and lower the weighted lower end of the casing, the float 41 is provided with parallel masts 50, suitably guyed to the boat and carrying adjustable cranes or overhanging arms 51, which support chains or cables 52, passing through eyes or pulleys 53 on the weighted end of the casing. The cranes or arms 51 are preferably arranged so as to extend rearward from the stern of the float, thus enabling the main float 41, the casing, and the auxiliary float 46 to line up with the direction in which the current of water is moving. In order to properly carry the casing when not in use, the deck of the float may be hollowed out in approximately semicylindrical form, as shown in Fig. 12, so as to form a recess or hold 54, said recess being open at the stern of the vessel, so as to enable the sluice-box to be drawn upon the float by means of a suitable windlass 55 and a connecting cable or rope.

From the foregoing description it will be seen that the machine may be operated either in a vertical, horizontal, or inclined position, and when operated in an inclined or horizontal position advantage may be taken of the current to revolve the casing in the manner described. When operating in a vertical position, the casing may be revolved by any suitable mechanism and motive power carried on the float. By the means described the friction incident to the rotation of the casing on the shaft is reduced to a minimum and the power required to drive the same proportionately decreased. It will also be seen that by reason of the adjustment of the discharge-spout 24 up and down on the casing and the provision of the removable door-sections the casing when positioned vertically may be operated in any desired depth of water. When operating in an inclined position, the angle of the casing may be adjusted according to the depth of the water and so as to present the pointed lower end of the casing at the proper angle to the bed of the stream for enabling the shovels to scoop up the mineral-bearing deposit.

Having thus described the invention, what is claimed, and desired to be secured by Letters Patent, is—

1. In a subaqueous mining-machine, a revoluble casing comprising an outer shell, an inner shell, a spiral web connecting the outer and inner shells, pockets disposed at intervals in the spiral web, shovels at one end of the sluice-box, and a spout projecting laterally from the outer shell and adjustable longitudinally thereof.

2. In a subaqueous mining-machine, a revoluble casing comprising an outer shell, an inner shell, a spiral web connecting the outer and inner shells, pockets disposed at intervals in the spiral web, shovels arranged at one end of the sluice-box, detachable door-sections along the outer shell, and a detachable spout interchangeable with said door-sections.

3. A subaqueous mining-machine comprising an outer shell having a longitudinal series of openings, an inner shell, a spiral web connecting the outer and inner shells, pockets disposed at intervals in the spiral webs, shovels at one end of the casing, a discharge-spout connected with the outer shell, flanges at the edges of the web extending across said openings in the outer shell, and rabbeted door-sections adapted to be secured to said flanges.

4. In a subaqueous mining-machine, the combination with a stationary shaft, and supporting means therefor; of a revoluble casing mounted thereon and comprising an outer shell, an inner shell, a spiral web connecting the outer and inner shells, pockets disposed at intervals in the spiral web, and antifriction-bearings contained within the inner shell and interposed between the same and the shaft.

5. In a subaqueous mining-machine, the combination with a stationary shaft, and means for supporting the same; of a revoluble casing mounted on the shaft and comprising an outer shell, an inner shell, a spiral web connecting the outer and inner shells, pockets disposed at intervals in the spiral web, annular shoulders on the stationary shaft, and antifriction-bearings associated with said shoulders and interposed between the inner shell and shaft.

6. A subaqueous mining-machine comprising a revoluble casing composed of inner and outer shells, a spiral floor connecting the shells from end to end and a concave bottom closing the lower end of the casing, shovels opening into the bottom, pockets disposed at intervals in the spiral floor, riffle-plates covering the floor, a discharge-way at the upper end of the casing, a shaft projected through the casing, and which supports the casing and on which it revolves, a rack-bar on the upper end of the shaft and means to actuate the rack-bar to lift the shaft with the casing.

7. A subaqueous mining-machine, comprising a revoluble casing composed of inner and outer shells, the outer shell being provided with longitudinal openings therein, a spiral floor connecting the said shells, pockets disposed at intervals in the spiral floor, a concave bottom closing the lower end of the casing, shovels to direct material to the interior of the casing, riffle-plates covering the spiral floor and the inner face of the outer shell, a discharge-way at the upper end of the casing, detachable closures for the openings in the outer shell, a shaft projected through the casing to support it, and serve as a bearing therefor, a rack-bar on the upper end of the shaft, and means to actuate the rack-bar to lift the shaft with the casing.

In testimony whereof I affix my signature in presence of two witnesses.

SOREN C. MONBERG.

Witnesses:
CHAS. E. BLOSFELD,
J. A. WRIGHT.